United States Patent [19]
Taga et al.

[11] Patent Number: 5,955,860
[45] Date of Patent: Sep. 21, 1999

[54] METHOD OF DETERMINING ELECTRICAL ANGLE AND APPARATUS FOR THE SAME

[75] Inventors: Yoshiaki Taga, deceased, late of Nerima-ku; Shigeo Taga, heir; Takiko Taga, heir, both of Tokorozawa; Tomoyo Taga, heir, Nagoya; Yasutomo Kawabata, heir, Aichi-gun, all of Japan

[73] Assignee: Toyota Jidosha Kabushiki Kaisha, Toyota, Japan

[21] Appl. No.: 08/880,163

[22] Filed: Jun. 24, 1997

[30] Foreign Application Priority Data

Jun. 24, 1996 [JP] Japan .................................. 8-184091

[51] Int. Cl.⁶ ...................................................... H02P 1/46
[52] U.S. Cl. ........................... 318/700; 318/721; 318/754; 318/138; 318/439; 318/720; 318/724
[58] Field of Search .................................... 318/721, 254, 318/138, 439, 700, 720, 724

[56] References Cited

U.S. PATENT DOCUMENTS

| | | |
|---|---|---|
| 5,254,914 | 10/1993 | Dunfield et al. . |
| 5,418,446 | 5/1995 | Halliday .................................. 318/721 |
| 5,448,149 | 9/1995 | Ehsani et al. . |
| 5,565,752 | 10/1996 | Jansen et al. . |
| 5,569,994 | 10/1996 | Taylor et al. . |
| 5,608,300 | 3/1997 | Kawabata et al. . |

FOREIGN PATENT DOCUMENTS 7-177788   7/1995   Japan .

OTHER PUBLICATIONS

N.M. Mvungi, et al., European Conference On Power Electronics And Application, vol. 4, pp. 390–393, "Sensorless Rotor Position Detection In SR Motor", Sep. 3–6, 1991.

Patent Abstracts of Japan, vol. 95, No. 10, Nov. 30, 1995, JP 07 177788, Jul. 14, 1995.

S.K. Panda, et al., IEE Proceedings–B, Electrical Power Applications, vol. 140, No. 1, part B, pp. 80–88, "Waveform Detection Technique For Indirect Rotor–Position Sensing of Switched–Reluctance MotorDrives Part 1: Analysis", Jan. 1993.

Primary Examiner—Karen Masih
Attorney, Agent, or Firm—Oblon, Spivak, McClelland, Maier & Neustadt, P.C.

[57] ABSTRACT

The prior art technique should return the voltage applied to a synchronous motor to zero in the process of measurement of an electrical angle. This causes foreign noises. The structure of the present invention utilizes the fact that the electrical angle of a three-phase synchronous motor 40 depends upon the inter-coil inductances. The procedure of the present invention applies a predetermined voltage for measurement to each combination of coils, and measures variations in electric currents flowing through the respective coils. The electric current flowing through each coil is attenuated in the presence of a driving current in the three-phase synchronous motor 40, compared with the case in the absence of a driving current. The procedure of the present invention accordingly refers to a table 122A to correct the observed values of electric currents based on the variations in electric currents, and refers to another table 122B to read the electrical angle $\pi$ corresponding to the corrected values of electric currents. The structure of the present invention can determine the electrical angle without returning the driving current to zero, thereby shortening the time period required for determination of the electrical angle while preventing the occurrence of foreign noises.

6 Claims, 16 Drawing Sheets

& #x20;

METHOD OF DETERMINING ELECTRICAL ANGLE AND APPARATUS FOR THE SAME

BACKGROUND OF THE INVENTION

1. Field of the Invention

The present invention relates to a method of determining an electrical angle in a synchronous motor and an apparatus for the same.

2. Description of the Related Art

As an apparatus for measuring an electrical angle with high precision in a synchronous motor even in the cased state of a rotor or at a low-revolving speed of the rotor, the applicant of the present invention has proposed an apparatus for observing a behavior of electric current flowing through each phase and determining an electrical angle based on the observed behavior (JAPANESE PATENT LAYING-OPEN GAZETTE No. 7-177788). In the case of a three-phase synchronous motor, for example, the proposed apparatus observes behaviors of electric currents flowing through any two phases, thereby unequivocally determining the electrical angle.

The proposed apparatus can determine the electrical angle with high precision even when the rotor is at a stop or at a low revolving speed. Foreign noises, however, sometimes occur in the process of determining the electrical angle in a synchronous motor with the proposed apparatus. The following describes this drawback in detail. The proposed apparatus carries out measurement while successively varying the combination of phases to which the voltage is applied. It is assumed that a three-phase synchronous motor is driven by making electric currents Iu, Iv, and Iw flow through U, V, and W phases. As shown in FIGS. 18A and 18B, the proposed apparatus returns the driving currents to zero at a predetermined timing, applies a voltage between U-WV phases to measure an electric current flowing through the U-phase at a timing m1 in FIG. 18B, applies the voltage between V-WU phases to measure an electric current flowing through the V-phase at a timing m2, and applies the voltage between W-UV phases to measure an electric current flowing through the W-phase at a timing m3. Since the sum of the electric currents flowing through the three phases is equal to zero, electric current sensors are required at two difference places, for example, in the U-phase and the V-phase.

In case that the respective phase currents are measured three times while a voltage is applied between each combination of phase-coils, several milliseconds are required for determination of the electrical angle. In order to ensure a certain level of precision, measurement of the electrical angle is required at every ten-odd milliseconds. The electric currents for measurement are thus flown for a period of several milliseconds at the intervals of ten-odd milliseconds as shown in FIGS. 18A and 18B. The known procedure returns the driving voltage applied to the synchronous motor to zero before application of a voltage for measurement, and resumes application of the driving voltage of the original level after conclusion of the measurement. The foreign noises occur in this process. The foreign noises become larger with an increase in torque current to the synchronous motor.

SUMMARY OF THE INVENTION

The object of the present invention is to prevent the occurrence of foreign noises while keeping the advantages of the proposed technique of determining the electrical angle.

At least part of the above and the other related objects is realized by a method of determining an electrical angle of a rotor unit in a synchronous motor, which makes a multi-phase alternating current flow through a plurality of phase-coils and causes the rotor unit to be rotated by an interaction between a magnetic field created by the plurality of phase-coils and a magnetic field created by a plurality of permanent magnets. The method of the present invention includes the steps of:

applying a predetermined voltage for measurement to be superposed upon a driving voltage applied to each phase-coil;

measuring an electric current flowing through each phase-coil in response to the predetermined voltage for measurement and correcting the observed value of electric current with an effect of the driving voltage, so as to obtain a corrected value of electric current flowing through each phase-coil; and determining the electrical angle of the rotor unit based on the corrected value of electric current flowing through each phase-coil.

In case that no driving current is supplied to each phase-coil of a synchronous motor, the electrical angle in the synchronous motor can be determined by applying a predetermined voltage for measurement to each combination of phase-coils and observing a behavior of electric current flowing through each phase-coil in response to the predetermined voltage applied. In case that the predetermined voltage for measurement is applied in the presence of the driving current supplied to the synchronous motor, on the other hand, the observed behavior of electric current is varied by the driving current. The method of the present invention accordingly carries out correction corresponding to the driving current supplied to the synchronous motor in the process of application of the predetermined voltage for measurement. This procedure accordingly determines the electric current flowing through each phase-coil in response to application of the predetermined voltage for measurement, and determines the electrical angle of the rotor unit based on the corrected value of electric current flowing through each phase-coil.

The method of the present invention can apply the voltage for measurement without returning the driving current flowing through the synchronous motor to zero. This restricts a variation in electric current accompanied by application of the voltage for measurement, thereby reducing the occurrence of foreign noises. A variety of techniques are applicable to correct the observed electric current with the effect of the driving voltage. An arbitrary technique can be applied to eliminate the effect of the driving current and determine the electrical angle with high precision.

One of the available techniques is applied in a first apparatus for determining an electrical angle of a rotor unit in a synchronous motor, which makes a multi-phase alternating current flow through a plurality of phase-coils and causes the rotor unit to be rotated by an interaction between a magnetic field created by the plurality of phase-coils and a magnetic field created by a plurality of permanent magnets. The first apparatus of the present invention includes: measurement voltage application means for applying a predetermined voltage for measurement to each combination of phase-coils; electric current behavior observation means for observing a behavior of electric current flowing through each phase-coil, in response to the predetermined voltage for measurement that is applied by the measurement voltage application means; storage means for previously storing a relationship between electrical angle and behavior of electric current flowing through each phase-coil in response to application of the predetermined voltage for measurement, with respect to each combination of phase-coils; correction means for correcting a variation in observed behavior of electric current flowing through each phase-coil with a driving current that flows through each phase in the synchronous motor during the predetermined voltage is applied for measurement; and electrical angle determination means for referring to the relationship stored in the storage means and determining the electrical angle of the rotor unit in the range of 0 to 2π, based on the behavior of electric current corrected by the correction means.

In the first apparatus of the present invention, the storage means stores the relationship between electrical angle and behavior of electric current flowing through each phase-coil only in response to application of a predetermined voltage for measurement, with respect to each combination of phase-coils. The measurement voltage application means applies the predetermined voltage for measurement to each combination of phase-coils, and the electric current behavior observation means observes a behavior of electric current flowing through each phase-coil in response to the predetermined voltage for measurement applied by the measurement voltage application means. The correction means corrects a variation in observed behavior of electric current flowing through each phase-coil with a driving current that flows through each phase in the synchronous motor during the predetermined voltage is applied for measurement. The electrical angle determination means refers to the relationship stored in the storage means and determines the electrical angle of the rotor unit in the range of 0 to 2π, based on the behavior of electric current corrected by the correction means.

The structure of the first apparatus corrects the observed electric current, which flows through each phase-coil in response to the predetermined voltage for measurement, with the effect of the driving current, in order to estimate the state in the absence of the driving current and determine the electrical angle. This structure enables the existing data representing the behaviors of electric currents to be utilized for determination of the electrical angle.

Another technique of correcting the observed electric current with the effect of the driving current is applied in a second apparatus for determining an electrical angle of a rotor unit in a synchronous motor, which makes a multi-phase alternating current flow through a plurality of phase-coils and causes the rotor unit to be rotated by an interaction between a magnetic field created by the plurality of phase-coils and a magnetic field created by a plurality of permanent magnets. The second apparatus of the present invention includes: voltage application means for applying a predetermined voltage for measurement to each combination of the phase-coils; electric current behavior observation means for observing a behavior of electric current flowing through each phase-coil, in response to the predetermined voltage for measurement applied by the voltage application means; driving current detection means for measuring a driving current supplied to each phase-coil at the time of application of the predetermined voltage for measurement; storage means for previously storing a relationship between electrical angle and behavior of electric current flowing through each phase-coil in response to the predetermined voltage for measurement that is applied to each combination of phase-coils while a driving current is flown in the synchronous motor; and electrical angle determination means for referring to the relationship stored in the storage means and determining the electrical angle of the rotor unit in the range of 0 to 2π, based on the observed behavior of electric current and the measured driving current.

In the second apparatus of the present invention, the storage means stores the relationship between electrical angle and behavior of electric current flowing through each phase-coil in response to a predetermined voltage for measurement that is applied to each combination of phase-coils while a driving current is flown in the synchronous motor. Upon condition that the voltage application means applies the predetermined voltage for measurement to each combination of phase-coils the electric current behavior observation means observes a behavior of electric current flowing through each phase-coil and the driving current detection means measures a driving current supplied to the synchronous motor. The electrical angle determination means refers to the relationship stored in the storage means and determines the electrical angle of the rotor unit in the range of 0 to 2π, based on the observed behavior of electric current and the measured driving current. This structure does not have the step of correcting the observed electric current in response to the application of the predetermined voltage for measurement, thereby further shortening the time period required for determination of the electrical angle.

These and other objects, features, aspects, and advantages of the present invention will become more apparent from the following detailed description of the preferred embodiments with the accompanying drawings.

DESCRIPTION OF THE PREFERRED EMBODIMENTS

Figure 2:
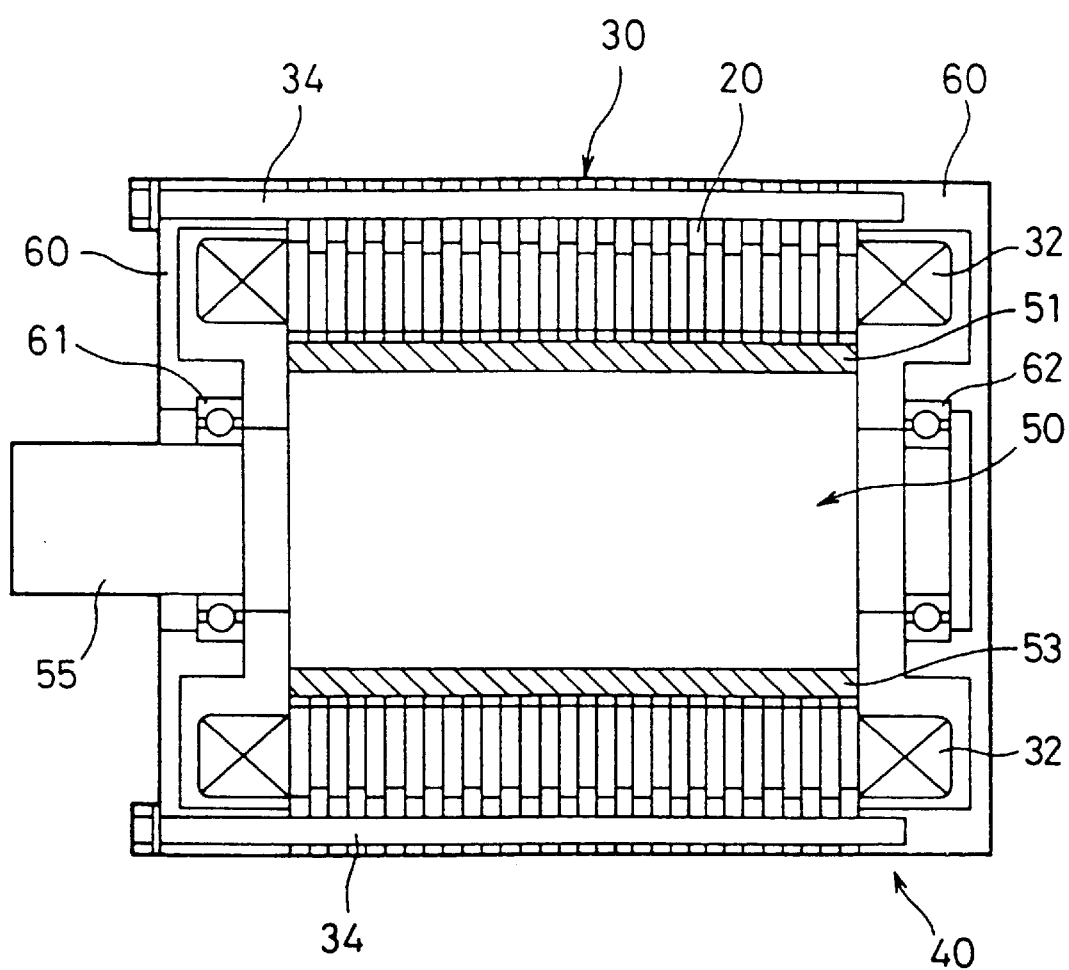
FIG. 2 schematically illustrates structure of a three-phase synchronous motor 40 with a stator unit 30 incorporated therein.
Figure 3:
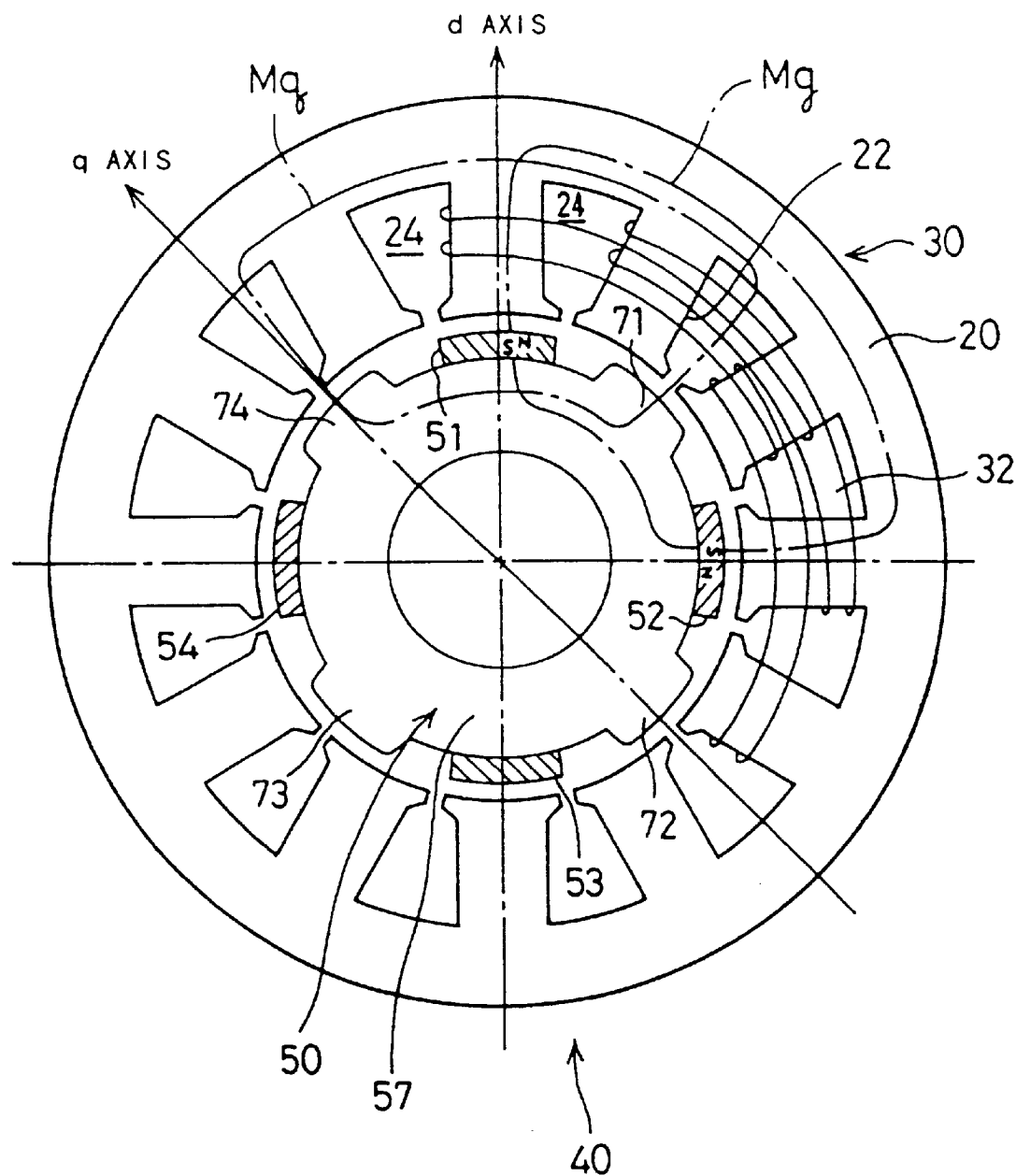
FIG. 3 is an end view illustrating the relationship between the stator unit 30 and a rotor unit 50 of the three-phase synchronous motor 40.

Some modes of carry out the present invention are described below as preferred embodiments. Referring to FIGS. 2 and 3, general structure of the three-phase synchronous motor 40 is described first. The three-phase synchronous motor 40 includes a stator unit 30, a rotor unit 50, and a casing 60 for accommodating the stator unit 30 and the rotor unit 50 therein. The rotor unit 50 has permanent magnets 51 through 54 attached to the periphery thereof. A rotating shaft 55 arranged on the axial center of the rotor unit 50 is supported rotatably by bearings 61 and 62 disposed in the casing 60.

The rotor unit 50 is constructed by laying a plurality of rotors 57, which are punched out of a thin plate of non-directional electromagnetic steel, one upon another. As clearly shown in FIG. 3, each rotor 57 has four salient poles 71 through 74, which are arranged perpendicular to one another. After the plurality of rotors 57 are laid one upon another, the rotating shaft 55 is pressed into the laminated rotors 57 to tentatively join the laminated rotors 57. The rotors 57 composed of the electromagnetic steel have insulating layers and adhesive layers formed on the surface thereof. Heating the laminated rotors 57 to a predetermined temperature causes the adhesive layers to be fused and joined with one another.

After the assembly of the rotor unit 50, the permanent magnets 51 through 54 are arranged between the salient poles 71 through 74 on the periphery of the rotor unit 50 and attached along the axis of the rotor unit 50. The permanent magnets 51 through 54 are magnetized in the direction of thickness. In the assembly of the rotor unit 50 and the stator unit 30, for example, the permanent magnets 51 and 52 create a magnetic path Md passing through the rotors 57 and stators 20 (see the one-dot chain line in FIG. 3).

Like the rotors 57, a plurality of stators 20 constituting the stator unit 30 are punched out of a thin plate of non-directional electromagnetic steel. As shown in FIG. 3, each stator 20 has twelve teeth 22. Stator coils 32 that make the stator unit 30 create a revolving magnetic field are wound on the teeth 22 to run through slots 24 formed between the teeth 22. The stator 20 has bolt holes for receiving fixation bolts 34 formed in the periphery thereof, although the bolt holes are omitted from the illustration of FIG. 3.

The stator unit 30 is assembled by heating and fusing the adhesive layers in the state that the plurality of plate-like stators 20 are laid one upon another and pressed against one another. The stator coils 32 are then wound on the teeth 22 of the stators 20. The assembled stator unit 30 is set in the casing 60, and the fixation bolts 34 are inserted into the bolt holes and clamped, so as to fix the stator unit 30 to the casing 60. The rotor unit 50 is subsequently set in the casing 60 to be rotatably supported by the bearings 61 and 62 of the casing 60. This completes the three-phase synchronous motor 40.

When exciting electric current is flown through the stator coils 32 of the stator unit 30 to create a revolving magnetic field, a magnetic path Mq is created to pass through the adjoining salient poles, the rotors 57, and the stators 20 as shown in FIG. 3. In the drawing of FIG. 3, an axis 'd' represents an axis of the magnetic flux that is created by the permanent magnets 51 through 54 and passes through the rotor unit 50 in the diametral direction, whereas an axis 'q' represents an axis of the magnetic flux that is created by the stator coils 32 of the stator unit 30 and passes through the rotor unit 50 in the diametral direction. In this embodiment having four poles, the axes 'd' and 'q' electrically have an angle of 90 degrees.

Figure 1:
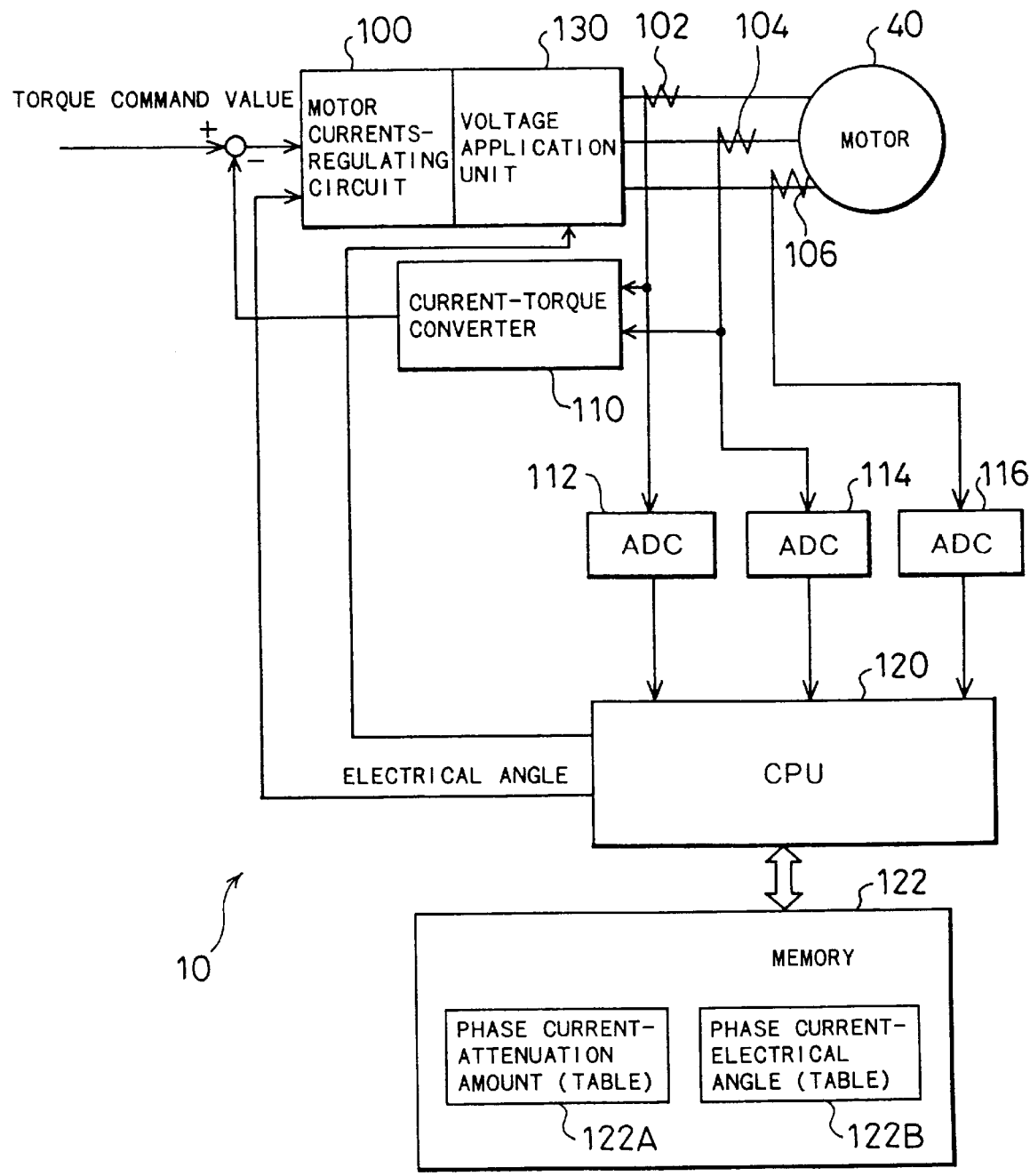
FIG. 1 is a block diagram schematically illustrating structure of a motor control apparatus 10 as a first embodiment according to the present invention.

Referring to FIG. 1, the following describes structure of the motor control unit 10. The motor control unit 10 includes a motor currents-regulating circuit 100 for receiving a torque command value from outside and regulating three-phase motor currents (U, V, and W phases) of the three-phase synchronous motor 40, and ammeters 102, 104, and 106 for respectively measuring a U-phase electric current Iu, a V-phase electric current Iv, and a W-phase electric current Iw of the three-phase synchronous motor 40. The motor control unit 10 further includes a current-torque converter 110 for converting the observed values of U-phase electric current Iu and the V-phase electric current Iv to torques; three analog-digital converters (ADC) 112, 114, and 116 for converting the observed values of electric currents to digital data, a one-chip microprocessor (CPU) 120 for executing arithmetic operations to determine an electrical angle, and a memory 112 for storing tables used for the arithmetic operation of an electrical angle. The torques converted by the current-torque converter 110 are summed up and subtracted from a torque command valuer so as to feedback control the actual torque in the three-phase synchronous motor 40. The motor currents-regulating circuit 100 has a voltage application unit 130 on its output stage. The voltage application unit 130 determines a voltage applied between the respective coils of the three-phase synchronous motor 40, in order to obtain the respective phase currents Iu, Iv, and Iw based on the torque command value. The voltage application unit 130 receives a control output from the CPU 120, so that the voltage applied to the respective coils of the three-phase synchronous motor 40 can be regulated externally. As shown in FIG. 1, the memory 122 has two tables stored therein; a table 122A used for correcting observed values of electric currents and a table 122B used for calculating an electrical angle from the corrected values of electric currents.

Figure 4:
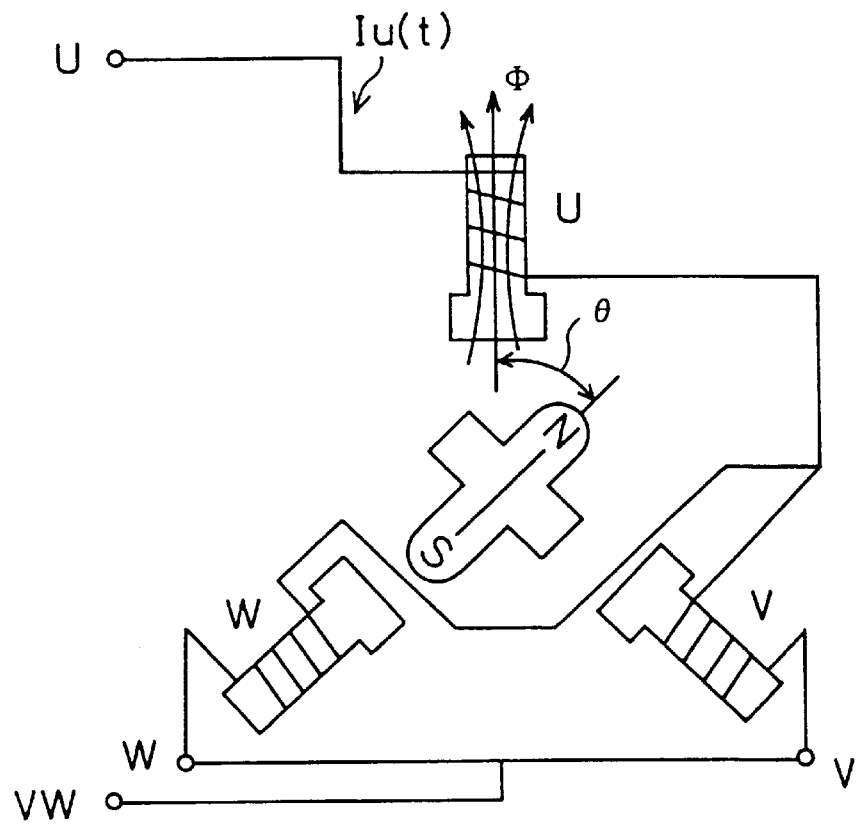
FIG. 4 shows an equivalent circuit of the three-phase synchronous motor in the first embodiment.
Figure 5:
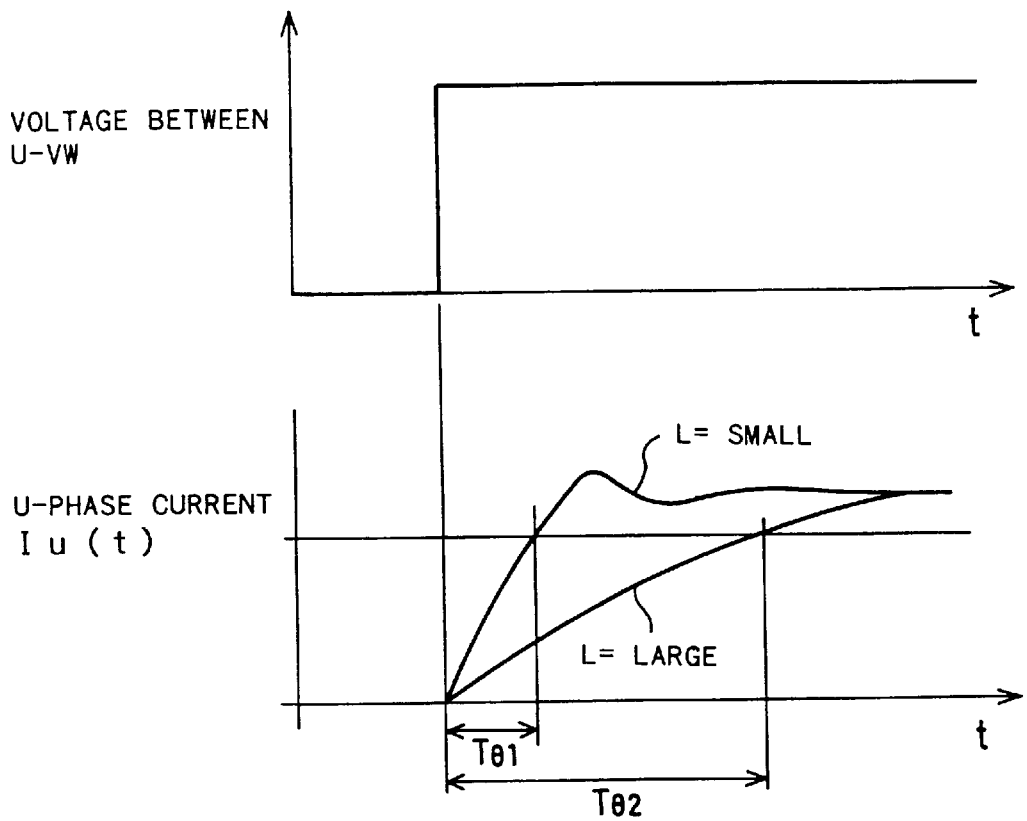
FIG. 5 is a graph showing a transient response of U-phase current Iu(t) when a voltage El is applied between the U-VW phases.

The following describes the principle and actual procedure of determining an electrical angle of the rotor unit 50 in the three-phase synchronous motor 40 of the above construction with the motor control unit 10 discussed above. FIG. 4 shows an equivalent circuit diagram of the three-phase synchronous motor 40. In case that a predetermined voltage El like a step function is applied between the U-phase and the VW-phase of the three-phase synchronous motor 40, an electric current flowing between the U-VW phases represents a transient response depending upon an inductance component L of the circuit. The graph of FIG. 5 shows an example of the transient response. The inductance L of the circuit is defined as a function of an electrical angle θ of the rotor unit 50. In case that the rotor unit 50 is not rotated and kept in a still state, the electrical angle, that is, the angle of the axis 'd' electrically formed with the axis 'q' in the rotor unit 50, determines the inductance L of the circuit.

The electric current Iu(t) flowing through the equivalent circuit shown in FIG. 4 (hereinafter referred to as the U-phase current) has a response defined by Equation (1) given below:

$$Iu(t)=\{1-\exp(-Rt/L)\}E1/R \qquad (1)$$

wherein exp( ) represents an exponential function, and R and t respectively denote the impedance of the circuit and the time. The U-phase current Iu(t) shows a gentle increase under the condition of a large inductance L. Measurement of the electric currents at a predetermined time point after the application of the voltage gives the inductances L and eventually determines the electrical angle θ.

Figure 6:
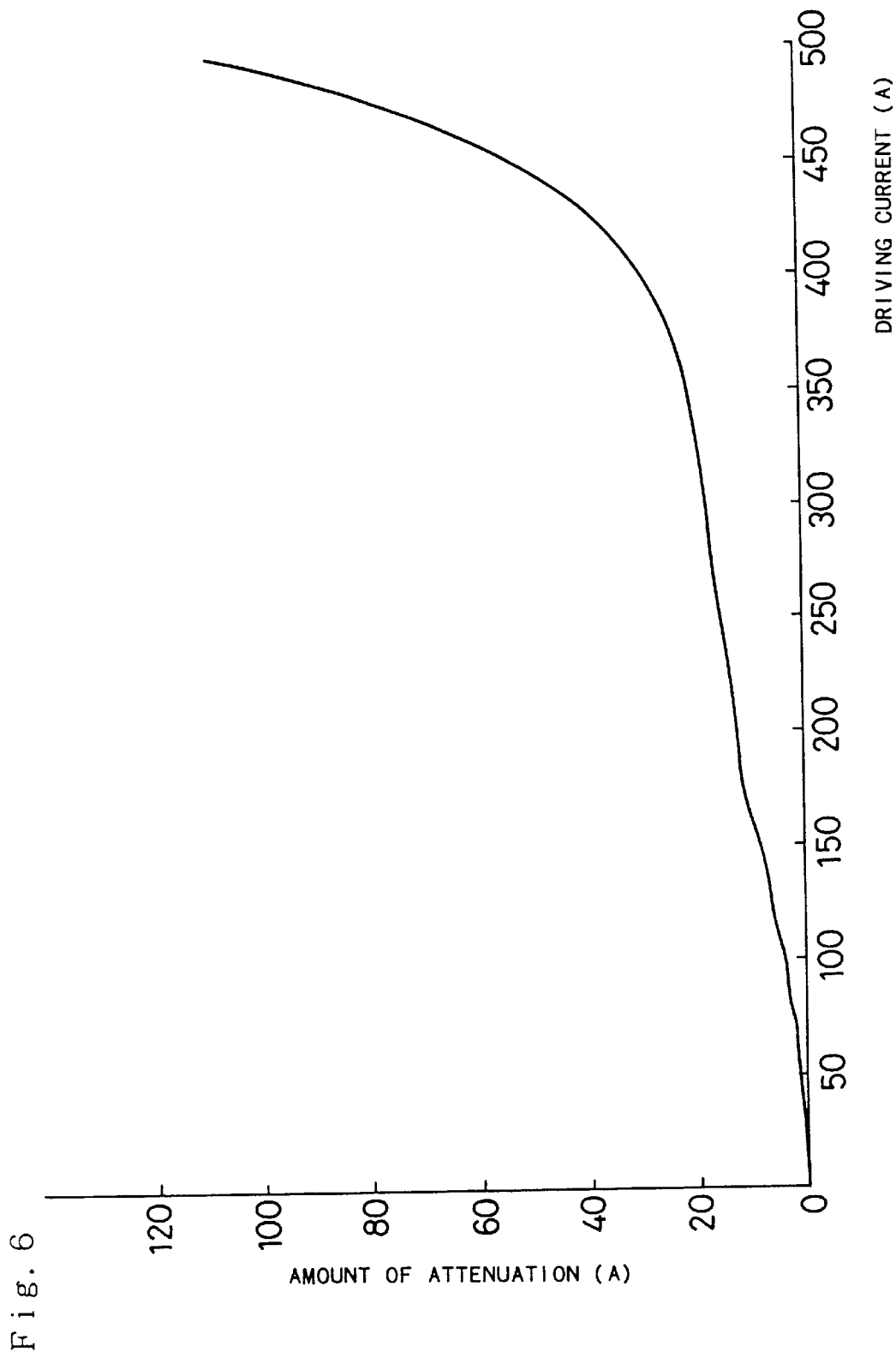
FIG. 6 is a graph showing the relationship between the driving current and the amount of attenuation that is stored as a table 122A in the memory 122 of the first embodiment.

When the voltage is applied for the measurement of the inductance L during operation of the three-phase synchronous motor 40, that is, in the state that a driving current flows through the U-phase, the U-phase current Iu(t) is affected by the driving current and attenuated from the transient response defined by the above Equation (1). The relationship between the amount of attenuation and the driving current can be measured in advance. The graph of FIG. 6 shows an exemplified relationship between the amount of attenuation and the driving current in the case of the three-phase synchronous motor 40 used in this embodiment. The amounts of attenuation corresponding to known driving currents of the respective phases can be read from the graph. Proper U-phase current Iu(t), V-phase current Iv(t), and W-phase current Iw(t) are determined by adding the amounts of attenuation to the respective phase currents Iu, Iv, and Iw observed. The graph representing the relationship between the amount of attenuation and the driving current of each phase is stored in the table 122A of the memory 122.

Figure 7:
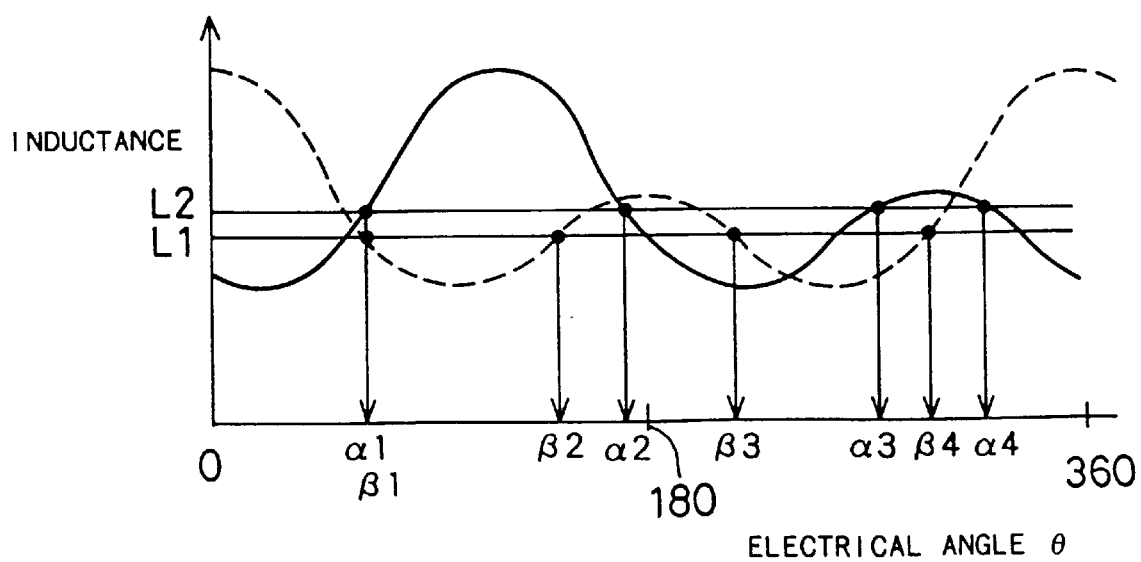
FIG. 7 is a graph showing the relationship between the coil inductance and the electrical angle θ.

Inductances Lu, Lv, and Lw of the U, V, and W phases are calculated from the variations in electric currents Iu, Iv, and Iw of the respective phases and eventually determine the electrical angle. Inductances of all the three phases are not necessary for the determination of the electrical angle, but inductances of any two phases are sufficient. In this embodiment, the inductances Lu and Lv are measured in advance for a variety of electrical angles and stored in the memory 122. The graph of FIG. 7 shows the observed relationship as an example. The curve of solid line represents the observed inductance between the U-VW phases plotted against the electrical angle, whereas the curve of broken line represents the observed inductance between the V-WU phases plotted against the electrical angle. The relationship between the observed inter-coil inductance and the electrical angle is stored in the table 122B used for determining the electrical angle according to the corrected value of electric current in the memory 122.

Figure 8:
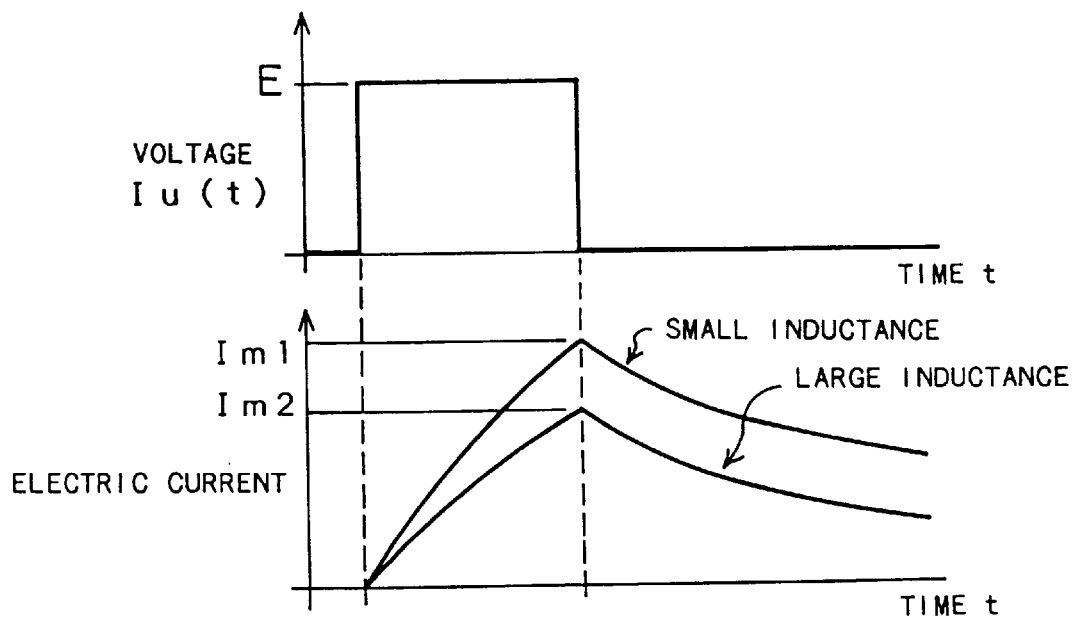
FIG. 8 shows a technique of determining the inductance based on the behavior of electric current under the condition of application of a predetermined voltage.

A concrete procedure first applies a voltage between the U-VW phases to measure an inductance L2, and then applies a voltage between the V-WU phases to measure an inductance L1. Only one angle of the rotor unit 50, that is, only one electrical angle, in the range of 0 to 2π corresponds to the inductance L2 between the U-VW phases and the inductance L1 between the V-WU phases. This is the electrical angle of α1=β1. Measurement of the phase currents Iu and Iv accordingly results in determining the electrical angle θ of the rotor unit 50. In the above discussion, determination of the inductance L between specific phases depends upon a time period TO that has elapsed before the electric current flowing between the specific phases reaches a predetermined level as shown in FIG. 5. In accordance with another possible procedure, determination of the inductance may depend upon a value of electric current Im that is obtained when a predetermined voltage is applied between specific phases for a predetermined time period, as shown in FIG. 8. The latter technique shown in FIG. 8 is used for the actual determination of the electrical angle, since the required processing time is fixed.

Figure 9A:
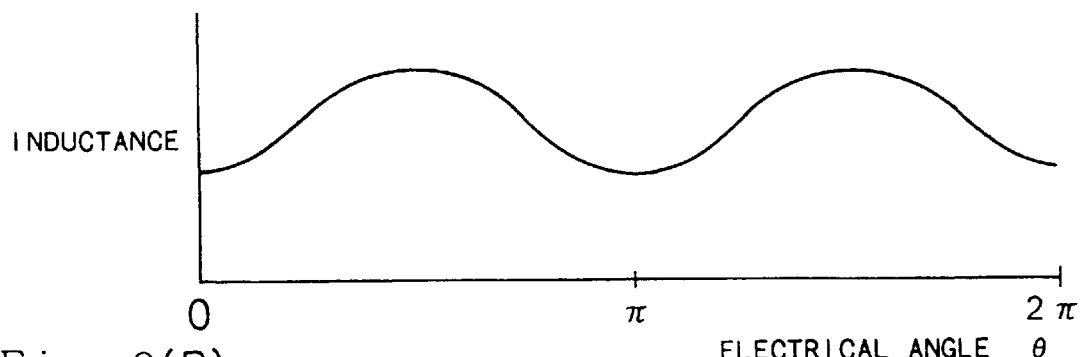
FIG. 9(A) and FIG. 9(B) are graphs showing the relationship between the electrical angle and the inductance.
Figure 9B:
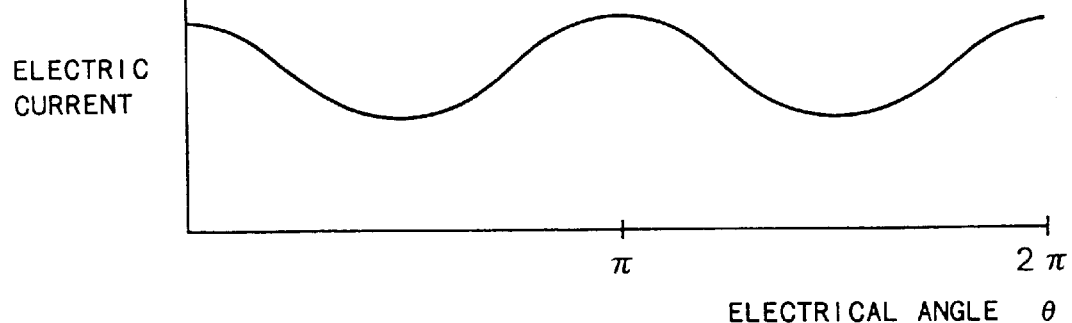
Figure 10:
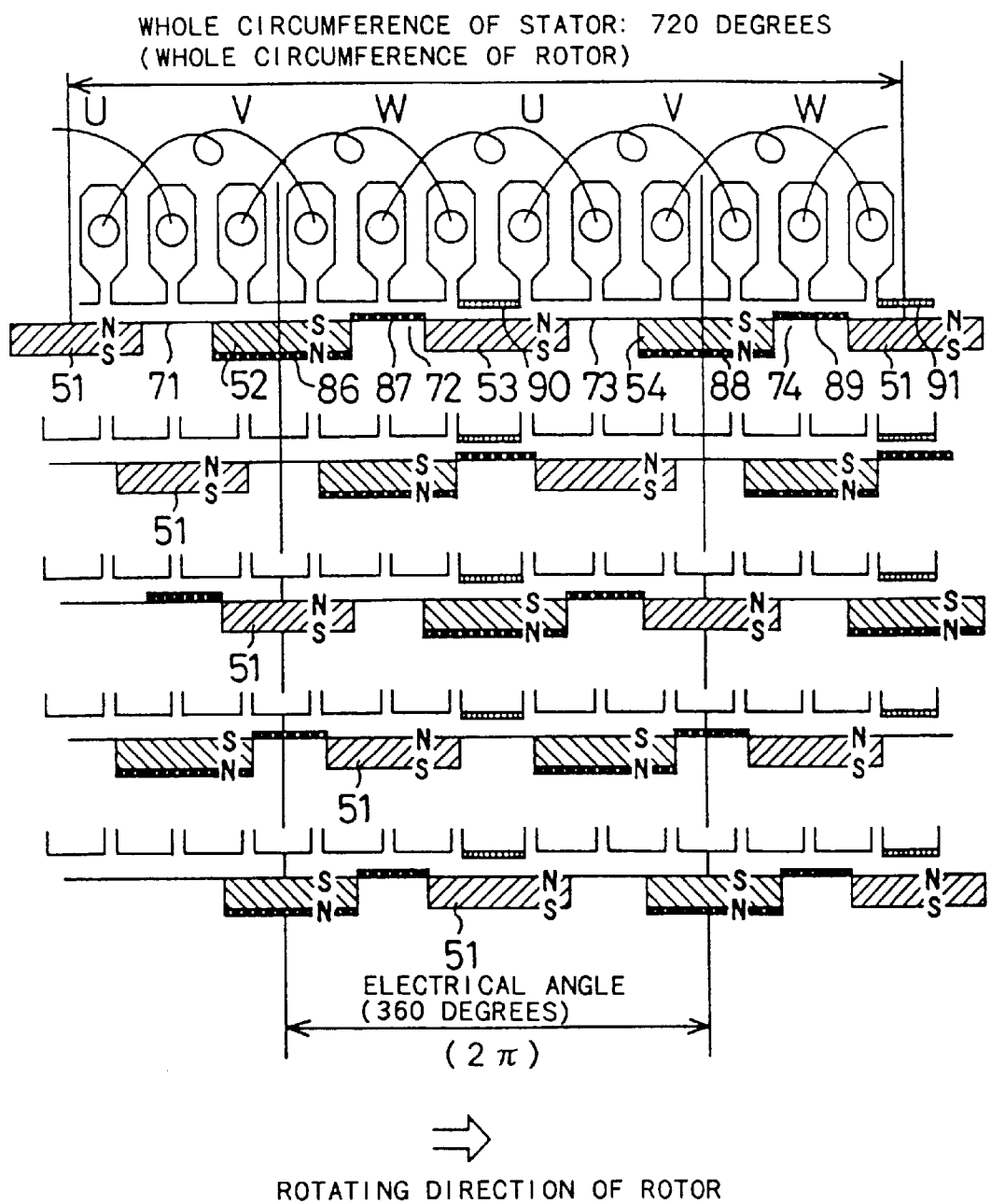
FIG. 10 shows the relationship between the stator unit 30 and the rotor unit 50 of the three-phase synchronous motor 40 in a linear configuration.

The observed curves shown in the graph of FIG. 7 have different inductance-electrical angle characteristics in the range of 0 to π and in the range of π to 2π. The inductance-electrical angle curve, however, essentially shows identical behaviors in the range of 0 to π and in the range of π to 2π as shown in the graph of FIG. 9. Calculation of the inductances L2 and L1 between the respective phases from the phase currents Iu and Iv gives two solutions that satisfy the relationship. In this embodiment, the magnetic relationship between the stator unit 30 and the rotor unit 50 is made unsymmetrical, so that the inductance L and the electrical angle θ hold an unsymmetrical relationship as shown in FIG. 7. In this embodiment, the unsymmetrical magnetic relationship between the stator unit 30 and the rotor unit 50 is realized by applying magnetic elements 86 through 89 to the magnetized one faces of the permanent magnets 52 and 54 and the surfaces of the salient poles 72 and 74. FIG. 10 shows the stator unit 30 and the rotor unit 50 of the three-phase synchronous motor 40 in a linear configuration for the better understanding. In the rotor unit 50, the magnetic elements 86 and 88 are arranged respectively on the lower faces of the permanent magnet 52 and the permanent magnet 54, whereas the magnetic elements 87 and 89 are respectively attached to the surfaces of the salient poles 72 and 74. The pair of permanent magnets 51 and 52 constituting the magnetic poles have different characteristics in the presence of the magnetic elements 86 and 87 and in the absence of the magnetic elements 86 and 87. The relationship between the electrical angle and the electric current flowing through each phase accordingly shows different behaviors in the first 180 degrees without the magnetic elements 86 and 87 (0 to π) and in the next 180 degrees with the magnetic elements 86 and 87 (π to 2π).

Figure 11:
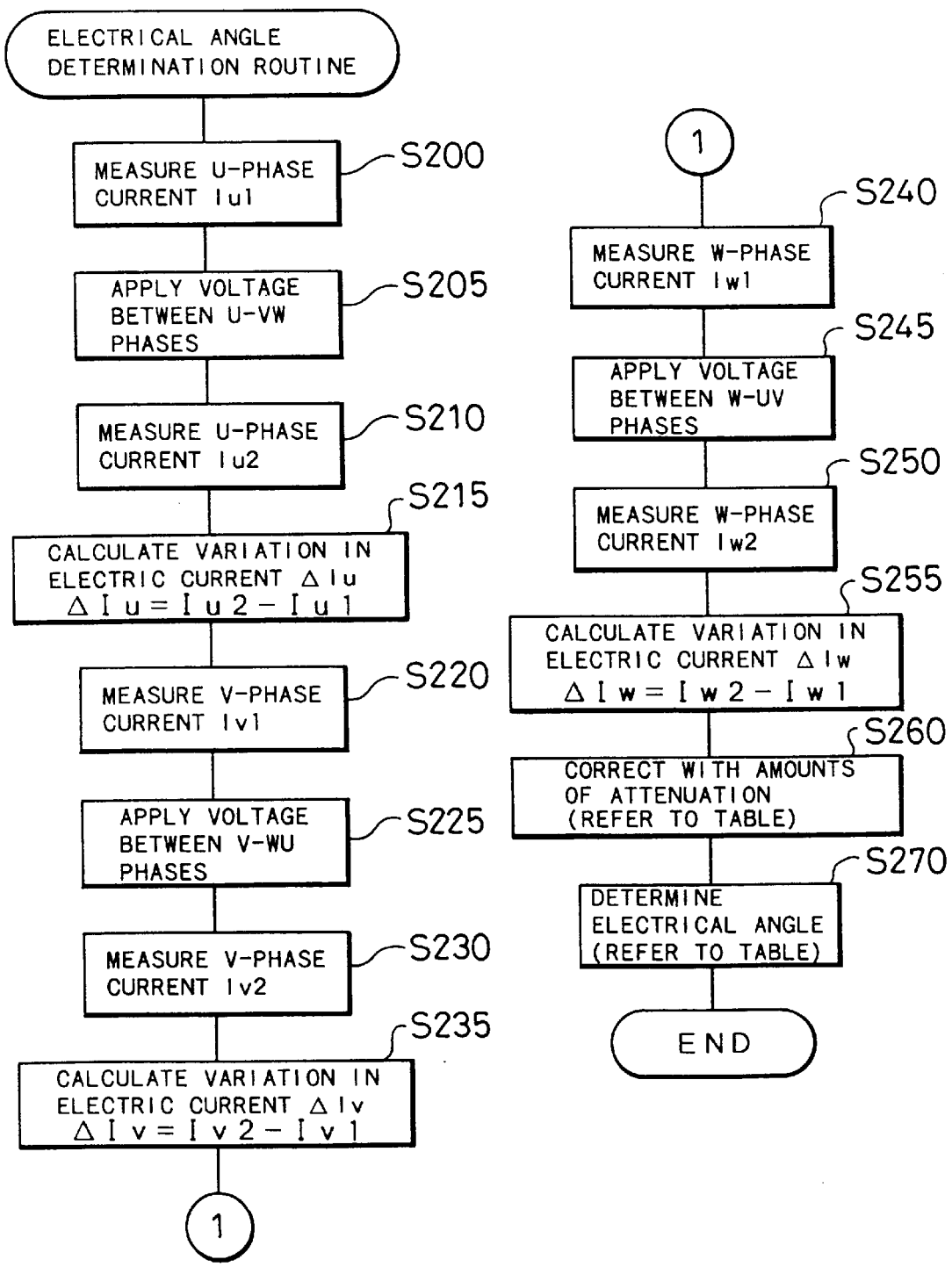
FIG. 11 is a flowchart showing an electrical angle determination routine carried out in the first embodiment.
Figure 12:
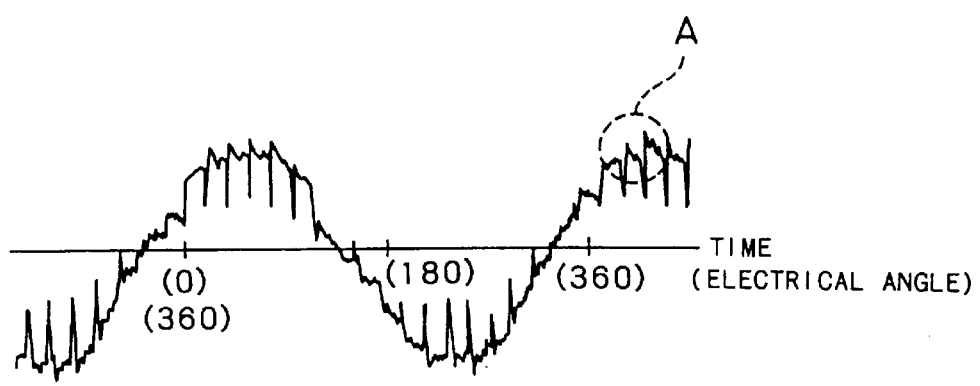
FIG. 12 is a graph showing a curve of the observed phase current.
Figure 13:
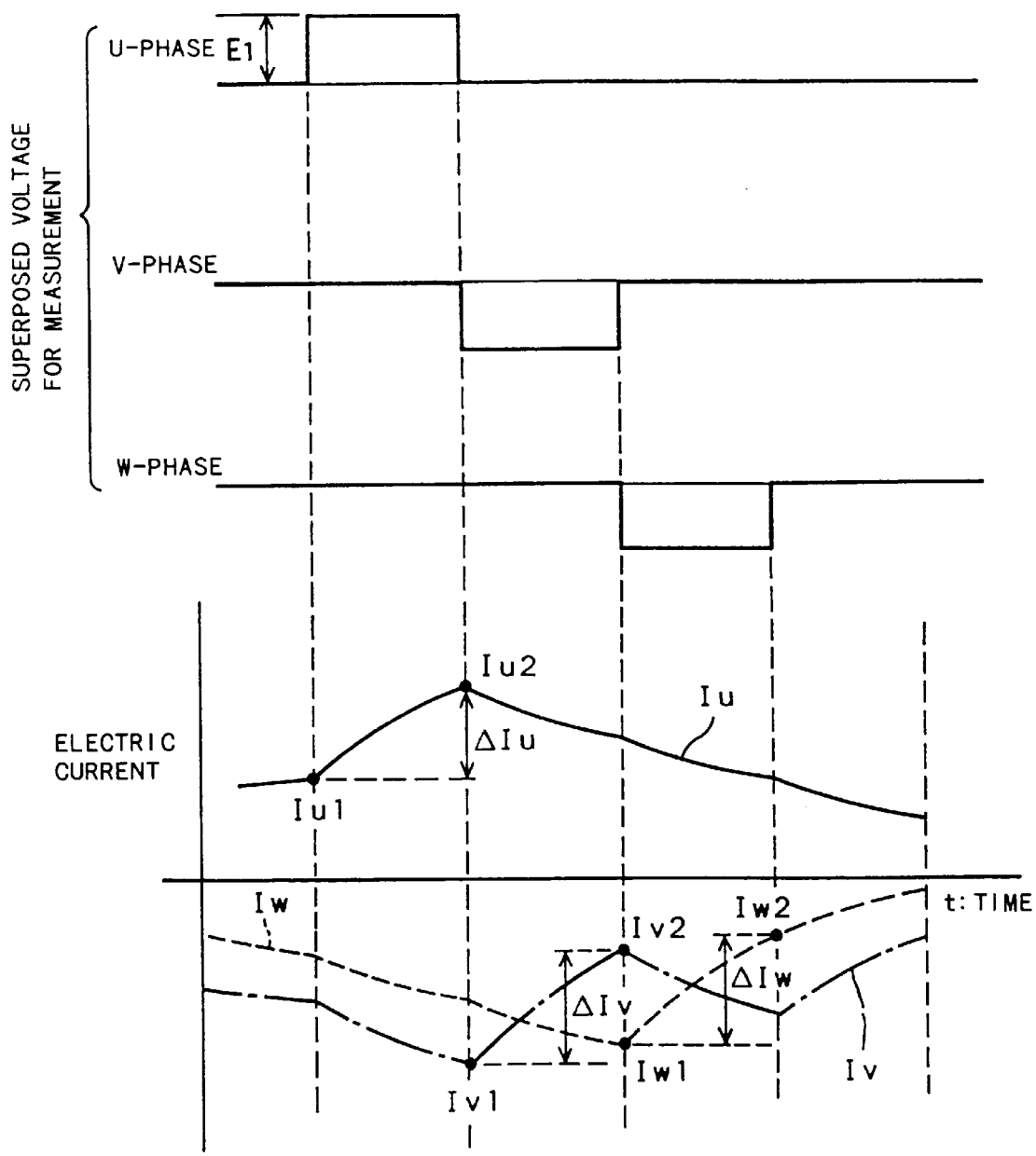
FIG. 13 is a graph showing the observed phase currents plotted against the voltage applied.

The above description refers to the outline of the technique that applies a predetermined voltage between the U-VW phases and between the V-Wu phases, measures the electric currents flowing through the U phase and the V phase, and determines the electrical angle θ based on the observed values of electric currents. The following describes a process of electrical angle determination carried out by the CPU 120 of this embodiment. FIG. 11 is a flowchart showing an electrical angle determination routine executed by the CPU 120. The electrical angle determination routine is activated at every 16 msec by a timer interruption and concluded in approximately 1 msec. FIG. 12 is a graph showing an observed curve of the U-phase current, and FIG. 13 shows measurement of electric current variations ΔI of the respective phases in this embodiment. The lower portion of FIG. 13 corresponds to expansion of an area 'A' in FIG. 12.

When operation of the three-phase synchronous motor 40 is required in response to a Power-ON, the CPU 120 successively applies a predetermined voltage between the respective coils, measures inductances between the coils, and determines the electrical angle θ of the ceased rotor unit 50 based on the principle shown in FIGS. 5 and 7. The CPU 120 makes a driving current flow through each phase according to the electrical angle θ, so as to actuate the three-phase synchronous motor 40. The CPU 120 subsequently carries out the process shown in the flowchart of FIG. 11 to determine the electrical angle of the rotor unit 50, while making the electric current flow through each phase and driving the three-phase synchronous motor 40.

When the program enters the routine of FIG. 11, the CPU 120 first reads a value of electric current Iu1 flowing through the U phase at the start of measurement at step S200, and applies a predetermined voltage (voltage for measurement) E1 like a step function between the U-VW phases at step S205. As shown in FIG. 13, application of a voltage for measurement in addition to a driving voltage varies the electric current flowing between the U-VW phases. The CPU 120 then reads a value of electric current Iu2 flowing through the U phase at a time point when application of the voltage for measurement is terminated at step S210, and calculates a variation ΔIu before and after the application of the voltage for measurement at step S215. The ADC 112 converts the analog outputs of the ammeters 102 to digital data, and the CPU 120 reads the digital data as observed values of electric currents. The above procedure is repeated for the V phase and the W phase. The CPU 120 reads values of electric currents Iv1 and Iw1 at the start of measurement (steps S220 and S240), applies the predetermined voltage for measurement (steps S225 and S245), reads values of electric currents Iv2 and Iw2 at the termination of application (steps S230 and S250), and calculates variations ΔIv and ΔIw (steps S230 and S255). Inductances of at least two phases are required for determination of the electrical angle as described above. The processing of, for example, steps S240 through S255 for the W phase may thus be omitted.

These variations ΔIu, ΔIv, and ΔIw are measured in the presence of the driving current and are attenuated from the proper variations in the absence of the driving current. For the purpose of correction, the CPU 120 refers to the table 122A stored in the memory 122, reads the amounts of attenuation corresponding to the electric currents Iu1, Iv1, and Iw1 at the start of measurement, and adds the amounts of attenuation to the respective variations ΔIu, ΔIv, and ΔIw. The CPU 120 accordingly obtains the values of phase currents Iu, Iv, and Iw that are equivalent to the measurements in the absence of the driving current at step S260.

The CPU 120 then determines the electrical angle based on the respective phase currents corrected by the amounts of attenuation at step S270. This process, in principle, follows the procedure discussed below. The inductances Lu, Lv, and Lw are obtained first through calculation from the corrected values of electric currents or otherwise by referring to a pre-stored table. The electrical angle θ corresponding to the three inductances Lu, Lv, and Lw is then read from the other table 122B stored in the memory 122. In accordance with a concrete procedure, the three calculated inductances Lu, Lv, and Lw are compared with inductance data Lu0, Lv0, and Lw0 of the respective phases stored in the table 122B, and an electrical angle θ0 giving a least sum of the differences is read from the table 122B. It is a practical way to treat one piece of inductance data as spare data, since all the three inductances may not always be measured properly. By way of example, a certain combination of calculated inductances Lu and Lv are compared with inductance data Lu0 and Lv0 stored in the table, and the corresponding electrical angle θ0 is read upon condition that the sum of the differences is not greater than a predetermined value. In case that the sum of the differences is greater than the predetermined value, on the contrary, another combination of calculated inductances Lv and Lw are compared with inductance data Lv0 and Lw0.

The standard procedure calculates the inductances from the values of electric currents of the respective phases and then determines the electrical angle based on the obtained inductances. The procedure of this embodiment, however, omits the process of calculating the inductances from the observed values of electric currents and refers to the table 122B stored in the memory 122, in order to directly read the electrical angle corresponding to the values of electric currents. The processing of step S270 in the flowchart of FIG. 11 compares the corrected values of electric currents Iu, Iv, and Iw with electric current data Iu0, Iv0, and Iw0 stored in the table 122B, in order to determine the electrical angle.

As discussed above, the procedure of this embodiment does not require the torque current to be returned to zero when the step voltage El is applied to each phase. This shortens the time period required to prepare for measurement as well as the time period required to return the electric current to the original level after the termination of measurement. Namely the procedure of the embodiment remarkably shortens the whole time period required for determination of the electrical angle. Since the electric current flowing between the respective coils is not returned to zero, this method desirably lessens a variation in electric current per unit time, thereby preventing occurrence of foreign noises.

The electrical angle θ thus obtained is output to the motor currents-regulating circuit 100 and used as information representing the rotational position of the rotor unit 50 in the course of operation of the three-phase synchronous motor 40 in order to specify the phase, to which the driving current is applied, among the U, V, and W phases of the stator coils 32. In the above embodiment, the magnetic relationship between the stator unit 30 and the rotor unit 50 is made unsymmetrical in the range of 0 to π and in the range of π to 2π, so that the electrical angle is unequivocally determined. Even when the magnetic relationship is symmetrical, however, some modification of the method enables the electrical angle to be properly determined in the range of 0 to 2π. The modified method first specifies the range of 180 degrees, in which the electrical angle of the rotor unit 50 exists, and successively assumes the current range of 180 degrees based on the revolving speed of the rotor unit 50.

Figure 14:
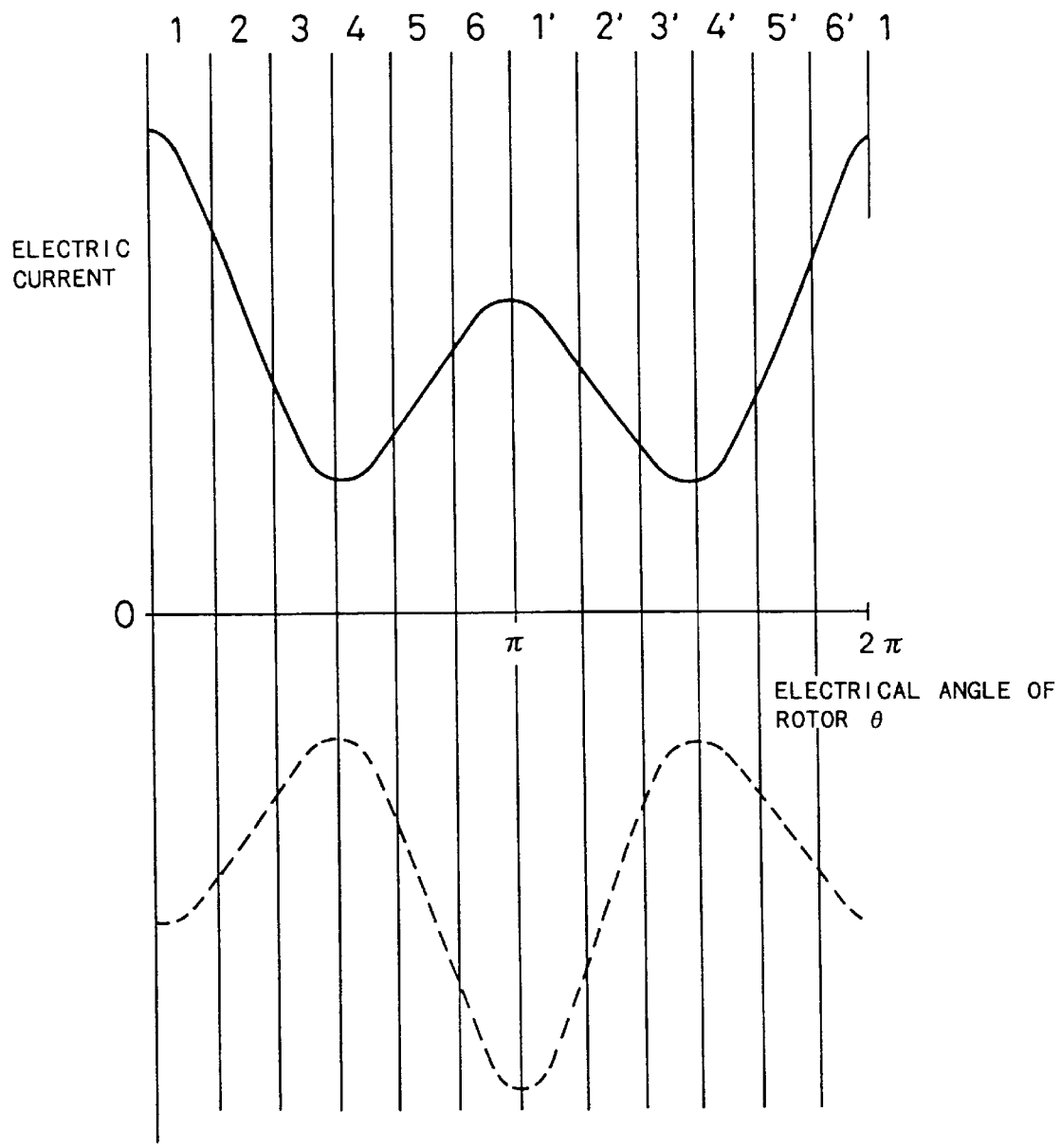
FIG. 14 is a graph showing variations in electric currents when voltages of opposed polarities are applied between the U-VW phases.
Figure 15:
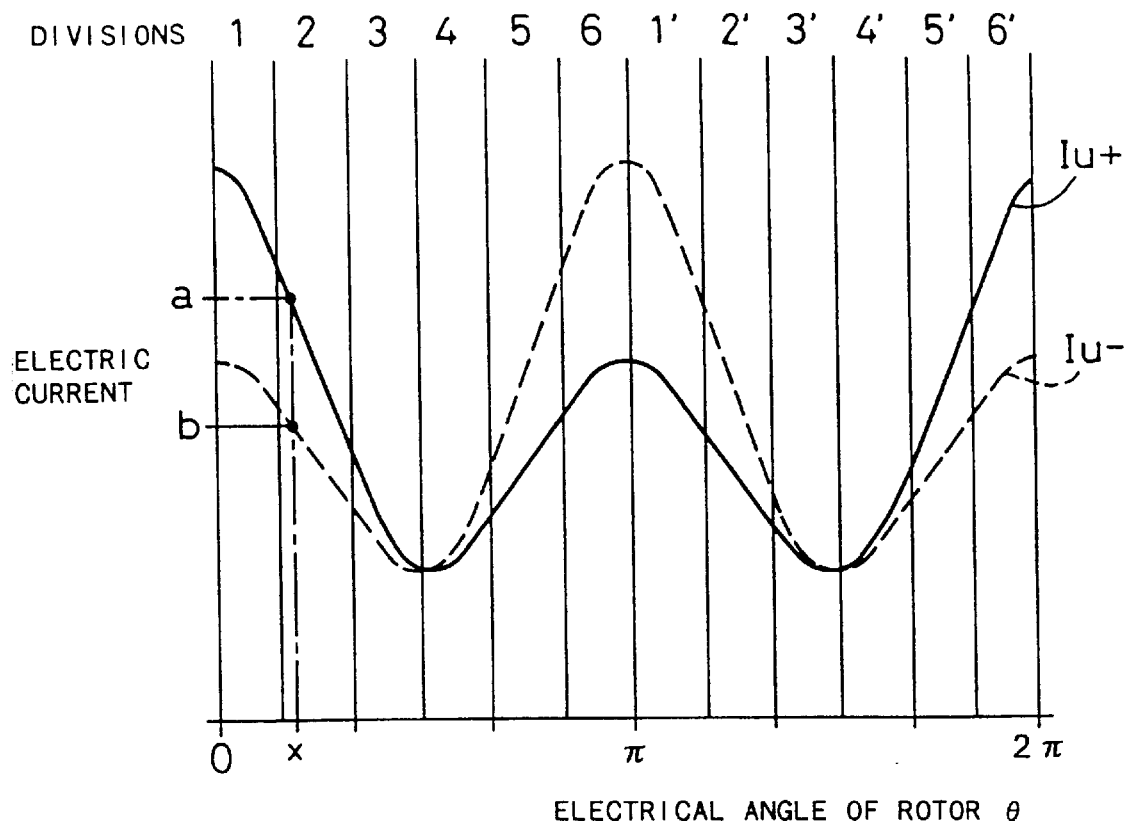
FIG. 15 is a graph showing a method of specifying the range of the electrical angle by taking advantage of a magnetic saturation.
Figure 16:
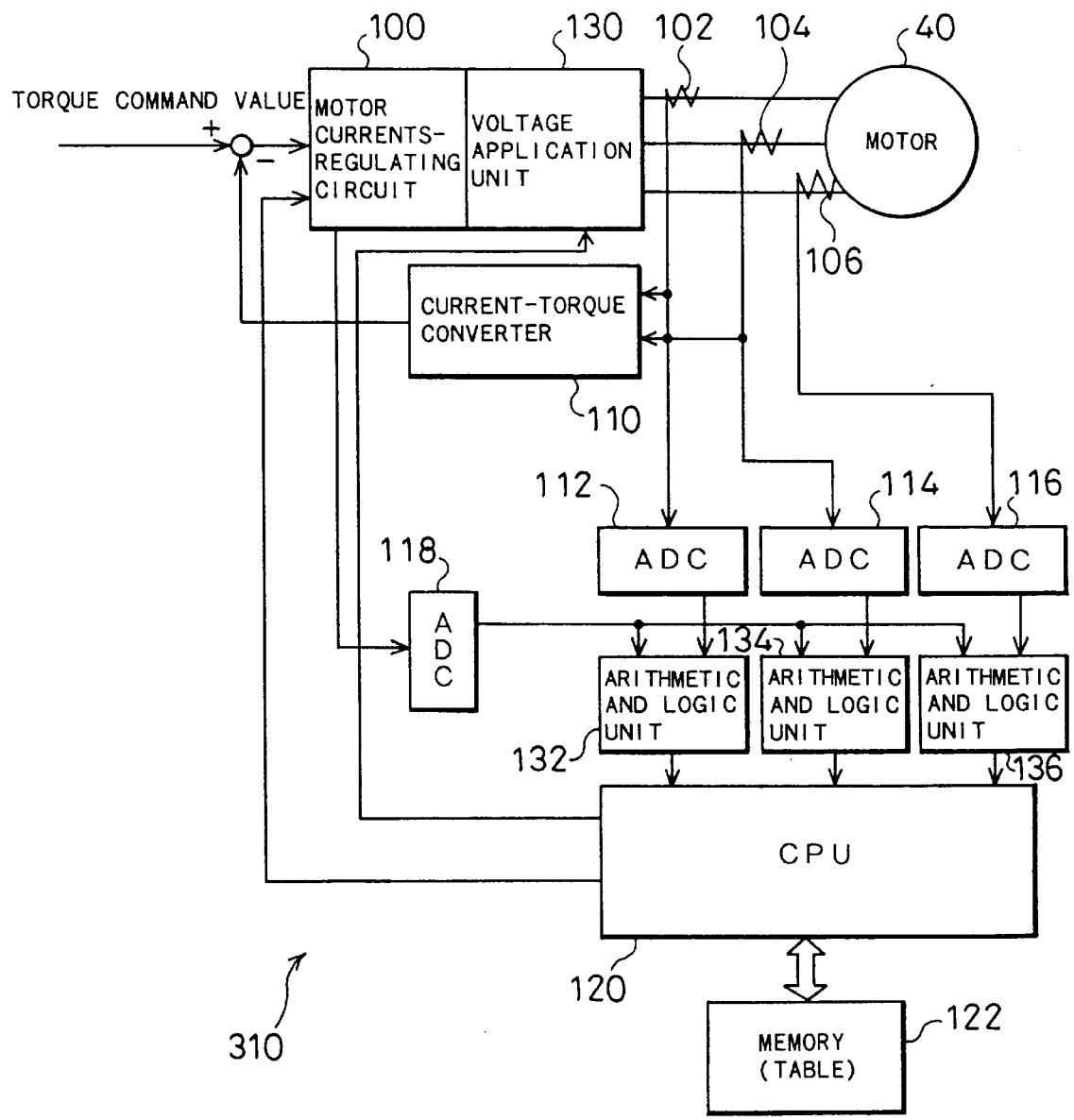
FIG. 16 is a block diagram schematically illustrating structure of another motor control apparatus 310 as a second embodiment according to the present invention.

For example, a voltage that causes a magnetic saturation between the U-VW phases is applied twice with opposed polarities, and the electric current flowing through the U-phase coil in response to each voltage is measured. FIG. 14 is a graph showing the electric current flowing through the U-phase in the respective polarities plotted against the electrical angle π of the rotor unit 50. In the graph of FIG. 15, the observed curve of electric current flowing through the U-phase when a negative voltage is applied between the U-VW phases is inverted and shown with the observed curve of electric current when a positive voltage is applied between the U-VW phases. The range of 0 to 2π is divided into 12 divisions for the clarity of illustration.

As shown in FIG. 15, in case that the electric current causes a magnetic saturation, the polarity of the applied voltage varies the relationship between the electrical angle π of the rotor unit 50 and the observed value of electric current. In divisions 1 to 3 and 4' to 6', the observed electric current in response to the positive voltage is greater than the observed electric current in response to the negative voltage. In divisions 4 to 6 and 1' to 3', on the contrary, the observed electric current in response to the negative voltage is greater than the observed electric current in response to the positive voltage. This characteristic is utilized to specify whether the electrical angle of the rotor unit 50 exists in the range of 0 to π or in the range of π to 2π. After the electrical angle is specified either in the range of 0 to π or in the range of π to 2π, the technique of the first embodiment discussed above with the drawings of FIGS. 11 and 13 is applied to determine the absolute electrical angle in the range of 0 to 2π.

While the rotor unit 50 ceases its rotation, the electrical angle π is unequivocally determined by making the electric current flow to cause a magnetic saturation between the U-VW phases. Specification of the range of 180 degrees in which the electrical angle exists is successively updated, based on the revolving speed of the rotor unit 50. This method can continue measuring the electrical angle π properly by only applying the voltage El for measurement that does not cause a magnetic saturation while keeping the magnetic relationship symmetrical. In the above embodiment, the electrical angle determination routine is activated at every 16 msec. Under the condition of high-speed rotation, a counterelectromotive force can be utilized for determination of the electrical angle. Determination of the electrical angle by taking advantage of the counterelectromotive force is generally available in a specific range of the maximum revolving speed to ⅕ the maximum revolving speed. The electrical angle may thus be determined by taking advantage of the inductances to the specific range and by taking advantage of the counterelectromotive force in the specific range. This enables the electrical angle to be measured from the ceased state to the maximum revolving speed without any additional sensors.

The following describes a second embodiment according to the present invention. In a motor control apparatus 310 of the second embodiment, the CPU 120 does not correct the observed values of electric currents for determination of the electrical angle. In the second embodiment, the memory 122 stores only a table used for determining the electrical angle according to the values of electric currents observed in the absence of a driving current (this corresponds to the table 122B in the first embodiment). The structure of the second embodiment has three arithmetic and logic units 132, 134, and 136 arranged between the ADCs 112, 114, and 116 and the CPU 120 for correcting the values of electric currents that are required in the process of determining the electrical angle while the driving current is flown through each phase.

The arithmetic and logic units 132, 134, and 136 are interposed between the ADCs 112, 114, and 116 and the CPU 120 to carry out data transformation. The arithmetic and logic units 132 through 136 receive the output data of the ADCs 112, 114, and 116 as well as the output data of an analog-digital converter (hereinafter referred to as ADC) 118 that converts a voltage signal corresponding to the driving current output from the motor currents-regulating circuit 100 to a digital signal. The motor currents-regulating circuit 100 outputs torque currents to the respective three phases, and the ADC 118 carries out the analog-to-digital conversion independently for the respective phases.

The arithmetic and logic unit 132, for example, receives a timing signal from the CPU 120, latches the observed values of U-phase electric current Iu1 and Iu2, calculates the difference between Iu1 and Iu2, reads the driving current at the moment, refers to the table, and outputs a corrected value of electric current (that is, the value of electric current equivalent to the measurement in the absence of a driving current) to the CPU 120. The CPU 120 outputs the timing signal to the arithmetic and logic unit 132 and obtains the value of electric current flowing through the U-phase in response to the application of the voltage for measurement. In the same manner, the CPU 120 obtains the values of electric currents flowing through the V-phase and the W-phase in response to the application of the voltage for measurement. The CPU 120 then refers to the memory 122 and determines the electrical angle of the rotor unit 50 based on the input values of electric currents.

Figure 17:
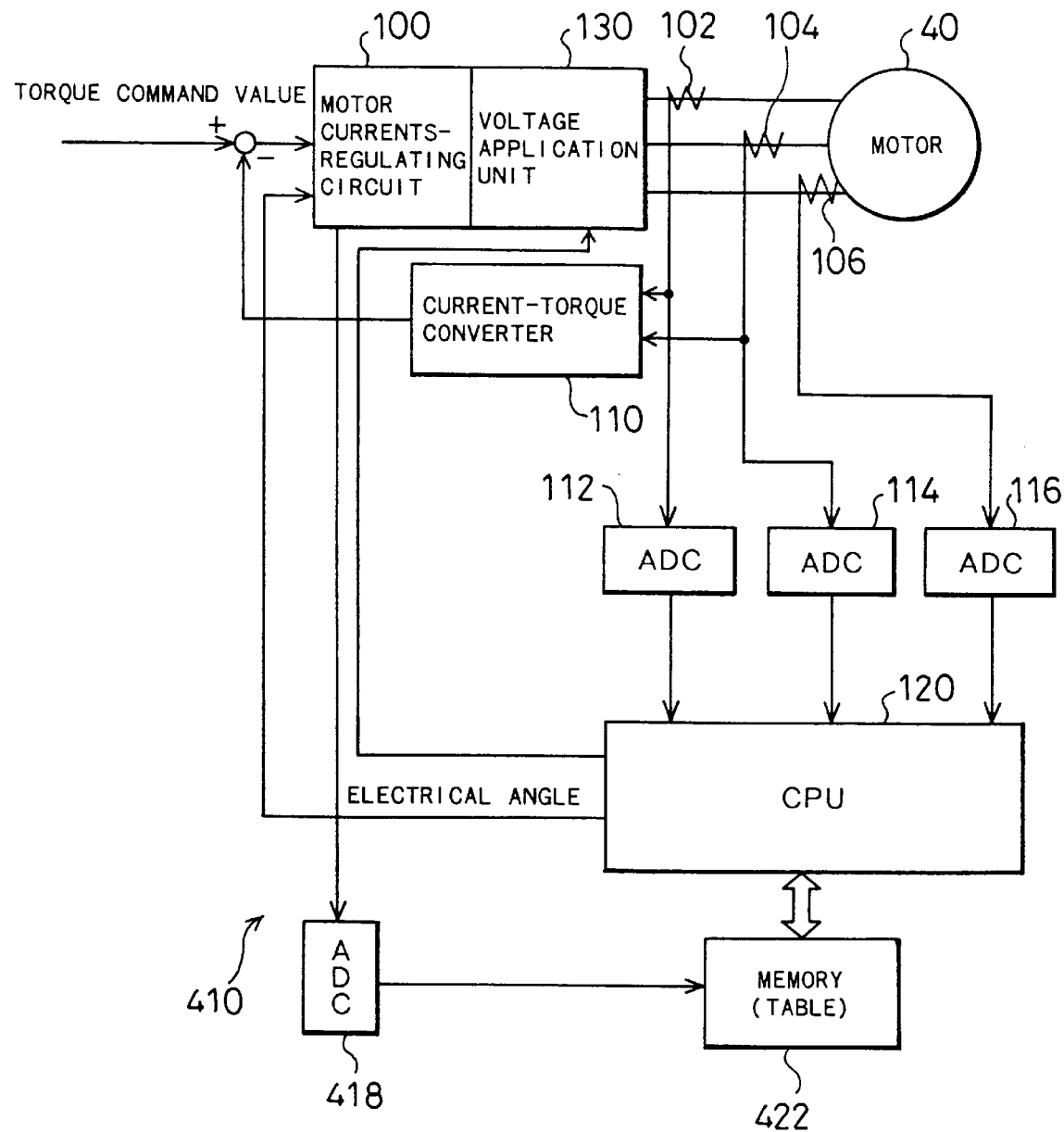
FIG. 17 is a block diagram schematically illustrating structure of still another motor control apparatus 410 as a third embodiment according to the present invention.
Figure 18A:
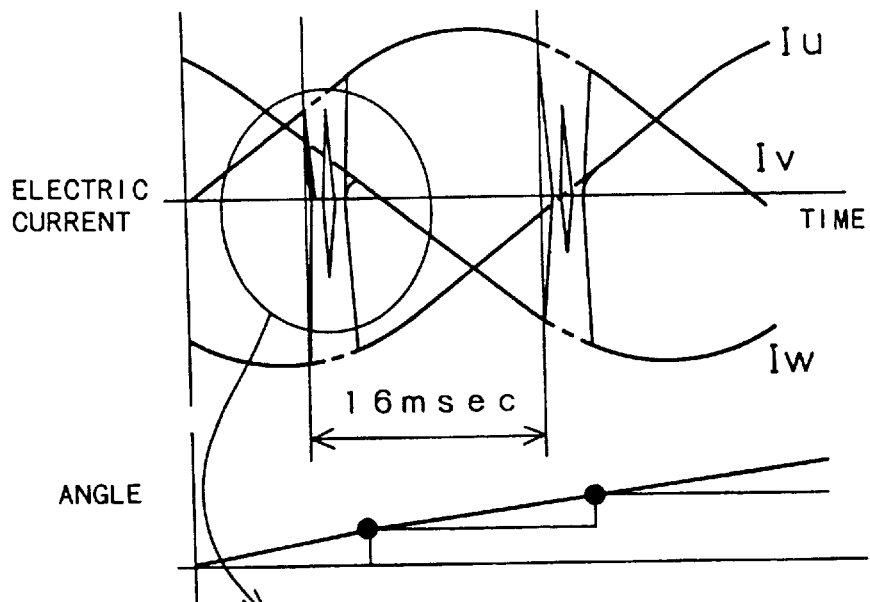
FIGS. 18(A) and 18(B) are graphs showing a prior art technique of determining the electrical angle.
Figure 18B:
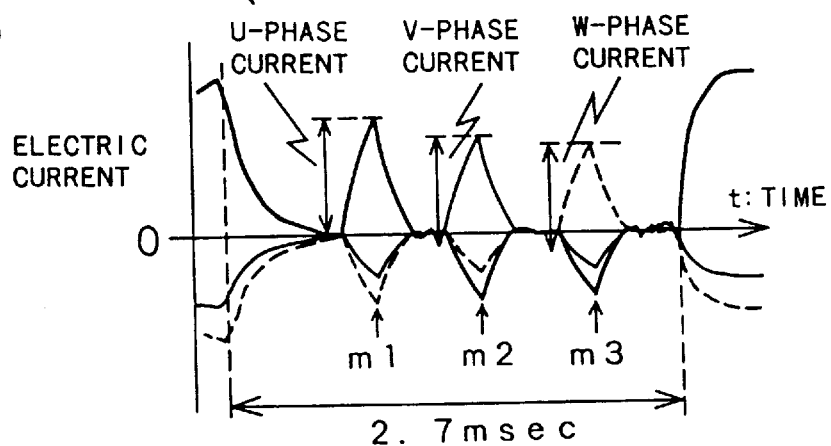

FIG. 17 shows still another motor control apparatus 410 as a third embodiment according to the present invention. In the structure of the third embodiment, the CPU 120 does not carry out correction of the observed values of electric currents for determination of the electrical angle. Like the second embodiment, the structure of the third embodiment includes an analog-digital converter (ADC) 418 that converts a voltage signal corresponding to the driving current output from the motor currents-regulating circuit 100 to a digital signal. The output data of the ADC 418 is directly input into a memory 422, and the CPU 120 utilizes the data when referring to a pre-stored table in the memory 422. The table stored in the memory 422 represents the three-dimensional relationship between the electrical angle, the driving current, and the observed value of each phase current in response to a voltage for measurement applied in the presence of the driving current. The procedure of the third embodiment calculates the variations ΔIu, ΔIv, and ΔIw of electric currents flowing through the respective phases at steps S200 through S255 of the first embodiment in the flowchart of FIG. 11 and directly determines the electrical angle based on the variations in phase currents without carrying out the correction at step S260.

The procedure of the third embodiment utilizes the three-dimensional table that is stored in the memory 422 and represents the relationship between the driving current, the variation ΔI in observed electric current, and the electrical angle. Unlike the first embodiment, the third embodiment can thus determine the electrical angle without correcting the observed values of electric currents with the amounts of attenuation due to the presence of the driving current. The structure of the third embodiment exerts the same effects as those of the first and the second embodiments; that is, shortening the required time for measurement while preventing the occurrence of foreign noises. The third embodiment does not carry out the correction, thereby further shortening the time required for the determination of the electrical angle.

The present invention is not restricted to the above embodiments, but there may be many modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A method of determining an electrical angle of a rotor unit in a synchronous motor, which makes a multi-phase alternating current flow through a plurality of phase-coils and causes said rotor unit to be rotated by an interaction between a magnetic field created by said plurality of phase-coils and a magnetic field created by a plurality of permanent magnets, said method comprising the steps of:

applying a predetermined voltage for measurement to be superposed upon a driving voltage applied to each phase-coil;

measuring an electric current flowing through each coil in response to the predetermined voltage for measurement and correcting the observed value of electric current with an effect of the driving voltage, so as to obtain a corrected value of electric current flowing through each coil; and determining the electrical angle of said rotor unit based on the corrected value of electric current flowing through each phase.

2. A method of determining an electrical angle of a rotor unit in a synchronous motor, which makes a multi-phase alternating current flow through a plurality of phase-coils and causes said rotor unit to be rotated by an interaction between a magnetic field created by said plurality of phase-coils and a magnetic field created by a plurality of permanent magnets, said method comprising the steps of:

previously storing a relationship between electrical angle and behavior of electric current flowing through each phase-coil in response to application of a predetermined voltage for measurement, with respect to each combination of phase-coils;

applying the predetermined voltage for measurement to said each combination of phase-coils;

observing a behavior of electric current flowing through each phase-coil in response to the predetermined voltage applied;

correcting a variation in observed behavior of electric current flowing through each phase-coil with a driving current that flows through each phase in said synchronous motor during the predetermined voltage is applied for measurement; and referring to said relationship and determining the electrical angle of said rotor unit in the range of 0 to $2\pi$, based on the corrected behavior of electric current.

3. A method of determining an electrical angle of a rotor unit in a synchronous motor, which makes a multi-phase alternating current flow through a plurality of phase-coils and causes said rotor unit to be rotated by an interaction between a magnetic field created by said plurality of phase-coils and a magnetic field created by a plurality of permanent magnets, said method comprising the steps of:

previously storing a relationship between electrical angle and behavior of electric current flowing through each phase-coil, in response to a predetermined voltage for measurement that is applied to each combination of phase-coils while a driving current is flown in said synchronous motor;

applying the predetermined voltage for measurement to each combination of phase-coils;

observing a behavior of electric current flowing through each phase-coil in response to the predetermined voltage applied;

measuring a driving current flowing through said each phase at the time of application of the predetermined voltage for measurement; and referring to said relationship and determining the electrical angle of said rotor unit in the range of 0 to $2\pi$, based on the observed behavior of electric current and the measured driving current.

4. An apparatus for determining an electrical angle of a rotor unit in a synchronous motor, which makes a multi-phase alternating current flow through a plurality of phase-coils and causes said rotor unit to be rotated by an interaction between a magnetic field created by said plurality of phase-coils and a magnetic field created by a plurality of permanent magnets, said apparatus comprising:

measurement voltage application means for applying a predetermined voltage for measurement to each combination of phase-coils;

electric current behavior observation means for observing a behavior of electric current flowing through each phase-coil, in response to the predetermined voltage for measurement that is applied by said measurement voltage application means;

storage means for previously storing a relationship between electrical angle and behavior of electric current flowing through each phase-coil in response to application of the predetermined voltage for measurement, with respect to said each combination of phase-coils;

correction means for correcting a variation in observed behavior of electric current flowing through each phase-coil with a driving current that flows through each phase in said synchronous motor during the predetermined voltage is applied for measurement; and electrical angle determination means for referring to the relationship stored in said storage means and determining the electrical angle of said rotor unit in the range of 0 to $2\pi$, based on the behavior of electric current corrected by said correction means.

5. An apparatus in accordance with claim 4, wherein said correction means determines an electric current in the absence of a driving voltage applied to each combination of phase-coils, based on the electric current flowing in response to application of the predetermined voltage for measurement.

6. An apparatus for determining an electrical angle of a rotor unit in a synchronous motor, which makes a multi-phase alternating current flow through a plurality of phase-coils and causes said rotor unit to be rotated by an interaction between a magnetic field created by said plurality of phase-coils and a magnetic field created by a plurality of permanent magnets, said apparatus comprising:

voltage application means for applying a predetermined voltage for measurement to each combination of phase-coils;

electric current behavior observation means for observing a behavior of electric current flowing through each phase-coil, in response to the predetermined voltage for measurement that is applied by said voltage application means;

driving current detection means for measuring a driving current supplied to said each phase-coil at the time of application of the predetermined voltage for measurement;

storage means for previously storing a relationship between electrical angle and behavior of electric current flowing through each phase-coil, in response to the predetermined voltage for measurement that is applied to each combination of phase-coils while a driving current is flown in said synchronous motor; and electrical angle determination means for referring to the relationship stored in said storage means and determining the electrical angle of said rotor unit in the range of 0 to $2\pi$, based on the observed behavior of electric current and the measured driving current.

* * * * *

UNITED STATES PATENT AND TRADEMARK OFFICE
CERTIFICATE OF CORRECTION

PATENT NO. : 5,955,860

DATED : September 21, 1999

INVENTOR(S): Yoshiaki TAGA, et al.

It is certified that an error appears in the above-identified patent and that said Letters Patent is hereby corrected as shown below:

On the title page, item [75] should be:

--[75] Inventors: Yoshiaki Taga, deceased, late of Aichi-gun; Shigeo Taga, heir; Takiko Taga, heiress, both of Tokorozawa; Tomoyo Taga, heiress, Nagoya; Yasutomo Kawabata, Aichi-gun, all of Japan--

Signed and Sealed this

Fifth Day of December, 2000

Attest:

Q. TODD DICKINSON

*Attesting Officer*     *Director of Patents and Trademarks*